United States Patent
Skärby et al.

(10) Patent No.: US 10,313,080 B2
(45) Date of Patent: Jun. 4, 2019

(54) INCREASING ROBUSTNESS OF HANDOVER SIGNALLING BY INCREASING THE AGGREGATION LEVEL OF CONTROL CHANNEL ELEMENTS

(71) Applicant: Telefonaktiebolaget LM Ericsson (publ), Stockholm (SE)

(72) Inventors: Christian Skärby, Stockholm (SE); Leo Hedlund, Älvsjö (SE); Mikael Jonsson, Vällingby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 97 days.

(21) Appl. No.: 15/516,913

(22) PCT Filed: Oct. 21, 2014

(86) PCT No.: PCT/SE2014/051239
§ 371 (c)(1),
(2) Date: Apr. 5, 2017

(87) PCT Pub. No.: WO2016/064310
PCT Pub. Date: Apr. 28, 2016

(65) Prior Publication Data
US 2017/0250788 A1    Aug. 31, 2017

(51) Int. Cl.
*H04L 5/00*    (2006.01)
*H04W 36/08*    (2009.01)

(52) U.S. Cl.
CPC .......... *H04L 5/0053* (2013.01); *H04L 5/0048* (2013.01); *H04W 36/08* (2013.01); *H04L 5/0073* (2013.01)

(58) Field of Classification Search
CPC ............................ H04L 5/0053; H04W 36/08
USPC .......................................................... 370/331
See application file for complete search history.

(56) References Cited

U.S. PATENT DOCUMENTS

2012/0093118 A1*  4/2012  Peters ................... H04L 1/0081
                                                              370/329

FOREIGN PATENT DOCUMENTS

| EP | 2446570 B1 | 11/2013 |
| EP | 2733875 A2 | 5/2014 |
| WO | 2009041779 A1 | 4/2009 |

* cited by examiner

*Primary Examiner* — Angel T Brockman
(74) *Attorney, Agent, or Firm* — Sage Patent Group

(57) ABSTRACT

A method performed by a network node 110, for improving the performance of a handover of a user equipment (UE) 120, wherein the network node 110 serves a first cell 130 comprising one or more UEs 120. When the network node 110 has detected that a Signaling Radio Bearer (SRB) is determined to be scheduled for a UE 120 in handover from the first cell 130 to a second cell 131, the network node 110 increases the Control Channel Element (CCE) aggregation level in an OFDM-subframe to be sent to the UE 120 in a TTI related to the handover. By increasing the CCE aggregation level during a handover procedure, the effective coding rate of the PDCCH is increased, which leads to a more robust coding and reliability. Thereby the number of unsuccessful handovers and lost service is effectively reduced.

12 Claims, 4 Drawing Sheets

---

301. Identify a UE involved in handover.

↓

302. Determine if SRB is scheduled in next TTI for the UE in handover.

↓

303. Increase CCE aggregation level for the UE in handover.

INCREASING ROBUSTNESS OF HANDOVER SIGNALLING BY INCREASING THE AGGREGATION LEVEL OF CONTROL CHANNEL ELEMENTS

TECHNICAL FIELD

Embodiments herein relate to a network node and a method therein. In particular, they relate to a method for handling handover of a User Equipment (UE) from a first cell to a second cell.

BACKGROUND

Communication devices such as UEs are enabled to communicate wirelessly in a cellular communications network or wireless communication system, sometimes also referred to as a cellular radio system or cellular networks. The communication may be performed e.g. between two UEs, between a UE and a regular telephone and/or between a UE and a server via a Radio Access Network (RAN) and possibly one or more core networks, comprised within the cellular communications network.

UEs may further be referred to as wireless terminals, mobile terminals and/or mobile stations, mobile telephones, cellular telephones, laptops, tablet computers or surf plates with wireless capability, just to mention some further examples. The UEs in the present context may be, for example, portable, pocket-storable, hand-held, computer-comprised, or vehicle-mounted mobile devices, enabled to communicate voice and/or data, via the RAN, with another entity, such as another wireless terminal or a server.

The cellular communications network covers a geographical area which is divided into cell areas, wherein each cell area is being served by a network node. A cell is the geographical area where radio coverage is provided by the network node.

The network node may further control several transmission points, e.g. having Radio Units (RRUs). A cell can thus comprise one or more network nodes each controlling one or more transmission/reception points. A transmission point, also referred to as a transmission/reception point, is an entity that transmits and/or receives radio signals. The entity has a position in space, e.g. an antenna. A network node is an entity that controls one or more transmission points. The network node may e.g. be a base station such as a Radio Base Station (RBS), eNB, eNodeB, NodeB, B node, or BTS (Base Transceiver Station), depending on the technology and terminology used. The network nodes may be of different classes such as e.g. macro eNodeB, home eNodeB or pico base station, based on transmission power and thereby also cell size.

Further, each network node may support one or several communication technologies. The network nodes communicate over the air interface operating on radio frequencies with the UEs within range of the network node. In the context of this disclosure, the expression Downlink (DL) is used for the transmission path from the base station to the mobile station. The expression Uplink (UL) is used for the transmission path in the opposite direction i.e. from the UE to the base station.

Long Term Evolution (LTE) is a radio access technology standardized by the 3rd Generation Partnership Project (3GPP). In LTE, network nodes, which may be referred to as eNodeBs or even eNBs, may be directly connected to one or more core networks. In LTE the cellular communication network is also referred to as E-UTRAN. The standard is based on Orthogonal Frequency-Division Multiplexing (OFDM) in the downlink and Single Carrier—Frequency Division Multiple Access (SC-FDMA) in the uplink.

An E-UTRAN cell is defined by certain signals which are broadcasted from the network node. These signals contain information about the cell which can be used by UEs in order to connect to the network through the cell. The signals comprise reference and synchronization signals which the UE uses to find frame timing and physical cell identification as well as system information which comprises parameters relevant for the whole cell.

In the time domain in the downlink, one subframe is divided into a number of OFDM symbols. One OFDM symbol further comprises a number of sub-carriers in the frequency domain. One OFDM symbol on one sub-carrier is referred to as a Resource Element (RE), shown as squares in FIG. 2 below.

In LTE, no dedicated data channels are used, instead shared channel resources are used in both DL and UL. These shared resources, are each controlled by a scheduler that assigns different parts of the DL and UL shared channels to different UEs for reception and transmission respectively.

The assignment information for where to find the payload data on the shared channels are transmitted in a control region covering a few OFDM symbols in the beginning of each downlink subframe. The data is transmitted in a data region covering the rest of the OFDM symbols in each downlink subframe. The size of the control region is either, one, two, three or four OFDM symbols and is set per subframe. The size is signaled as a specific Control Format Indicator (CFI) to the UE for each subframe on the so called Physical Control Format Indicator Channel (PCFICH). In order to allow data in form of voice services as well as data services to be sent over LTE, high data transfer rates are necessary. This is achieved by keeping the size of the control region to a minimum at all times, thereby maximizing the size of the data region.

Each assignment, i.e. a pointer to the set of REs where the payload data is actually sent, is transmitted on a physical channel named Physical Downlink Control Channel (PDCCH) in the control region. There are typically multiple PDCCHs in each subframe and the UEs will be required to monitor the PDCCHs to be able to detect the assignments directed to them and in that way being able to find the data directed to them.

The PDCCH is mapped to a number of Control Channel Elements (CCEs), each CCE comprising a set of 36 REs. The CCEs may be scheduled in the subframe as an aggregation of 1, 2, 4 or 8 CCEs. These four different alternatives are herein referred to as aggregation level 1, 2, 4, and 8 respectively. The variable size achieved by the different aggregation levels is used to adapt the coding rate to a required Block Error Rate (BLER) level for each PDCCH. The total number of available CCEs in a subframe will vary depending on, among other things, the number of OFDM symbols used for control. The CCEs which make up the PDCCH, will be spread in time and frequency in a pseudo random manner within the control region. A few of the REs within the control region will however be used for Cell specific Reference Signals (CRS). These REs will not be used by CCEs, at least not within the same cell.

The CRS are UE known symbols that are inserted in a RE of the subframe of an OFDM time and frequency grid and broadcasted by the network node. The CRS are used by the UE for downlink channel estimation. Channel estimation is used for demodulation of downlink data both when the UE is in connected state and is receiving user data and when the UE is in idle state and is reading system information. Due to the latter use case, the CRS must be transmitted even from cells which do not have any UEs connected.

In case several antennas are used by the network node for transmitting and each antenna is representing a cell, each antenna has to transmit a unique CRS in order for the UE to connect to that specific cell. When one antenna transmits, the other antennas have to be silent in order not to interfere with the first antennas CRS. To reduce the interference of reference signals between the cells, the position in the grid of the CRS is usually shifted in frequency between the cells by applying a frequency offset between the CRS sent in the different cells on a site.

The main advantages using such configuration are low interference on CRS and low level of contamination of channel quality estimates. On the other hand, shifted CRS will introduce increased interference on channels used for signaling as well as data in neighboring cells. Although this solution reduces the interference of CRS between cells, it has the problem that the CRS of one cell will disturb the PDCCH and the Physical Downlink Shared Channel (PDSCH) symbols of neighboring cells.

This has shown to affect handover performance negatively in a significant way, since the assignment to a handover command via the PDCCH is affected by the interference from the shifted CRS in neighboring cells. The reduction of handover performance often leads to loss of service for the affected UE. This is especially a problem when voice services are provided, since a dropped call due to loss of service will not be accepted by a user.

SUMMARY

It is therefore an object of embodiments herein to improve the performance of a handover for a UE in a wireless communications network.

According to a first aspect of embodiments herein, the object is achieved by a method performed by a network node, for handling handover of a user equipment, UE. The network node serves at least a first cell comprising a UE. When a Signaling Radio Bearer, SRB, is determined to be scheduled for the UE in handover from the first cell to a second cell, the network node increases a Control Channel Element, CCE, aggregation level in an Orthogonal Frequency Division Multiplexing, OFDM, subframe to be sent to the UE. The subframe is sent in a Transmission Time Interval (TTI) related to the handover.

According to a second aspect of embodiments herein, the object is achieved by a network node for performing the method for handling handover of a user equipment, UE. The network node is configured to serve a first cell comprising one or more UEs. The network node is further configured to increase a Control Channel Element, CCE, aggregation level in a subframe sent to the UE in a Transmission Time Interval, TTI, related to the handover.

Contrary to previous teachings, it has been shown that the method described herein drastically increases the quality of the connection. The method has shown to be especially beneficial for data demanding services, such as Voice over LTE (VoLTE). By increasing the CCE aggregation level, an improved robustness of the PDCCH towards interference is achieved at the expense of data transfer during handover. However, since the robustness of the PDCCH is only increased during critical parts of the connection, i.e. during handover, the overall system capacity can be retained. This will increase the retainability, i.e. reduce the number of unsuccessful handovers and lost service whilst maintaining a high spectral efficiency of the system.

BRIEF DESCRIPTION OF THE DRAWINGS

Examples of embodiments herein are described in more detail with reference to attached drawings in which.

DETAILED DESCRIPTION

Figure 1:
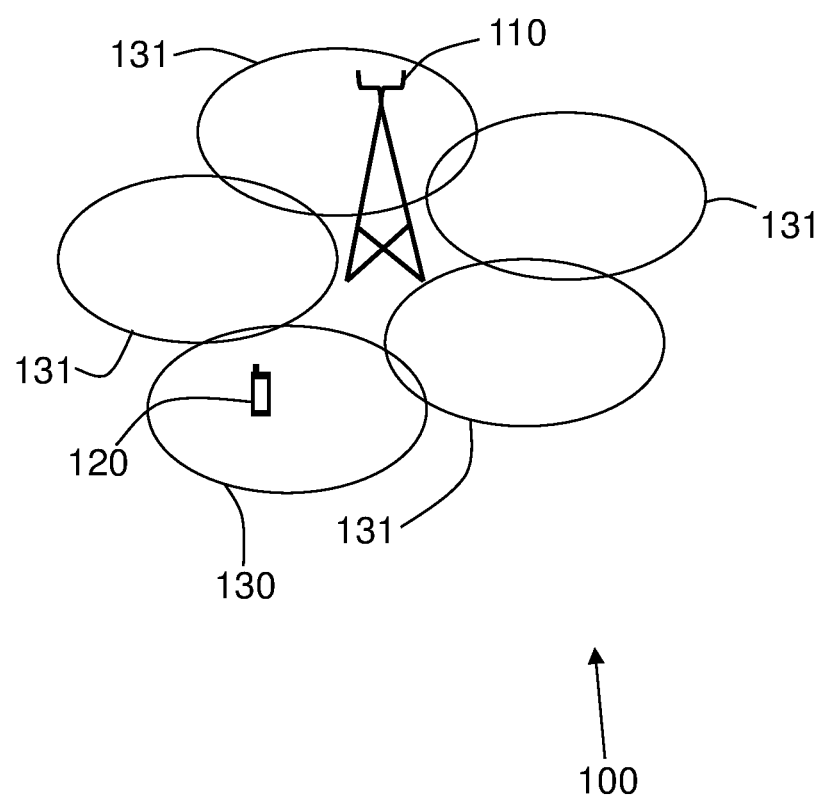
FIG. 1 is a schematic block diagram illustrating embodiments of a wireless communications network.

FIG. 1 depicts an example of a wireless communications network 100 according to a first scenario in which embodiments herein may be implemented. The wireless communications network 100 is a wireless communication network such as an LTE, E-Utran, any 3GPP cellular network, Wimax, or any cellular network or system applying OFDM-signaling.

The wireless communications network 100 comprises a plurality of network nodes whereof one network node 110 is depicted in FIG. 1. The network node 110 may be a transmission point such as a radio base station, for example an eNB, an eNodeB, or an Home Node B, an Home eNode B or any other network node capable to serve a wireless terminal such as UE or a machine type communication device in a wireless communications network. The network node 110 serves a plurality of cells, such as a first cell 130 and one or more second cells 131.

A UE 120 operates in the wireless communications network 100. The network node 110 may be a transmission point for the UE 120. The UE 120 is within radio range of the first cell 130 and the one or more second cells 131, this means that it can hear signals from the first cell 130 and the one or more second cells 131. The UE 120 is camping on the first cell 130.

The UE 120 may e.g. be a wireless terminal, a wireless device, a mobile wireless terminal or a wireless terminal, a mobile phone, a computer such as e.g. a laptop, a Personal Digital Assistant (PDA) or a tablet computer, sometimes referred to as a surf plate, with wireless capability, or any other radio network units capable to communicate over a radio link in a wireless communications network. Please note the term wireless terminal used in this document also covers other wireless devices such as Machine to Machine (M2M) devices.

Figure 2:
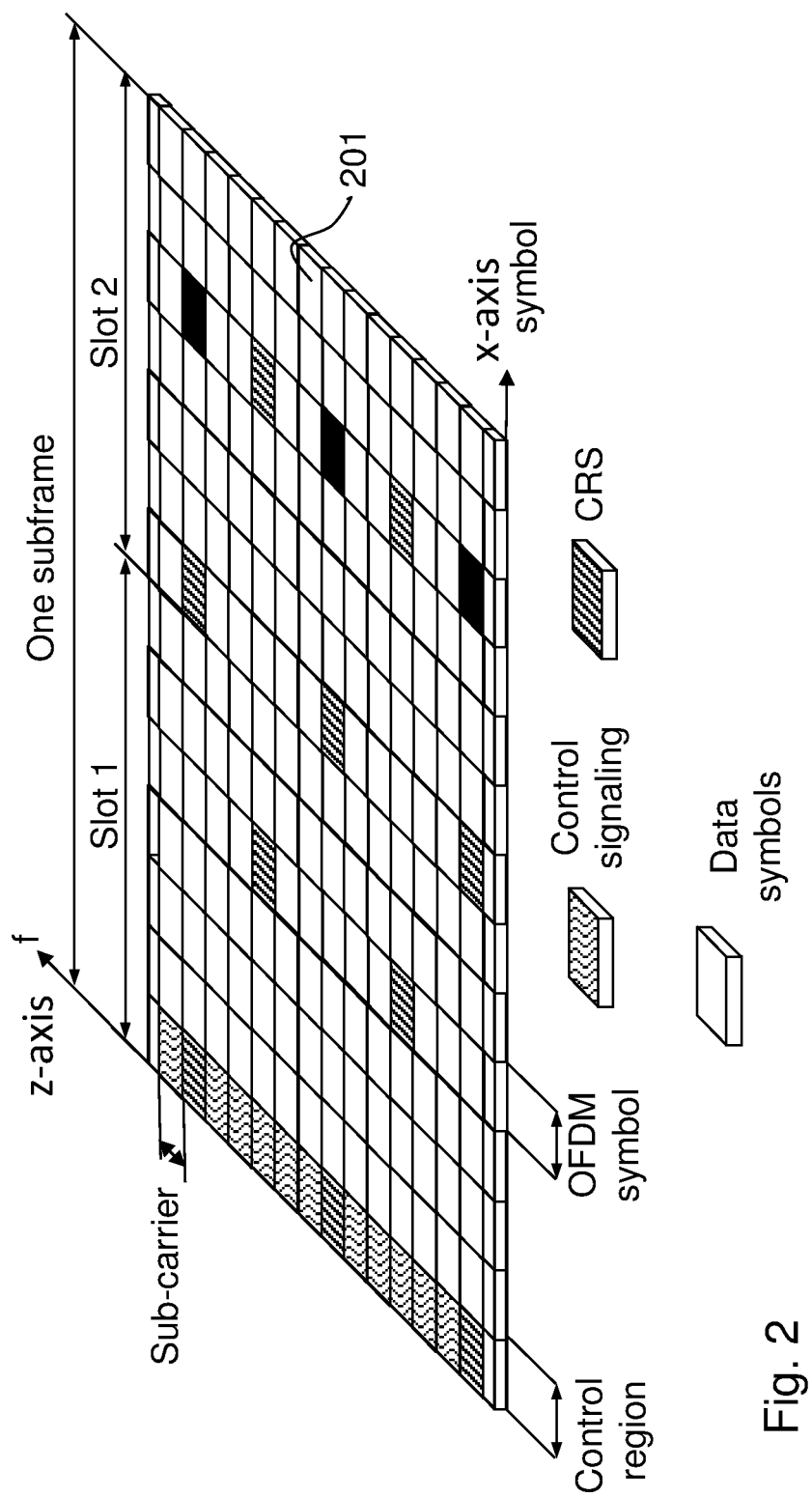
FIG. 2 is a schematic block diagram illustrating embodiments of an OFDM subframe.

FIG. 2 shows an exemplary downlink OFDM time and frequency grid related to embodiments herein, which is also referred to as an OFDM subframe. Each subframe comprises two slots. Each slot comprises a number of REs 201 extending both in the time domain (x-axis) and in the frequency domain (z-axis). Each RE's 201 extension in the frequency domain is referred to as a sub-carrier whereas the extension in the time domain is referred to as an OFDM symbol. As can be seen in FIG. 2, the first OFDM symbol comprises control signaling, such as PDCCH, and CRS which carries the necessary information about the network node 110 to allow the UE 120 to connect to it. The control signaling is located in the beginning of each subframe, also known as the control region of the subframe, and spans the full bandwidth of the subframe. FIG. 2 shows an exemplary size of a common control region of one OFDM symbol, the size of the control region may however be dynamically adjusted according to the current traffic situation.

The PDCCH is mapped to a number of Control Channel Elements (CCEs), each CCE comprising a set of 36 REs 201. The CCEs may be scheduled in the subframe as an aggregation of 1, 2, 4 or 8 CCEs. The variable size achieved by the different aggregation levels is used to adapt the coding rate to a required Block Error Rate (BLER) level for each PDCCH. The total number of available CCEs in a subframe will vary depending on, among other things, the number of OFDM symbols used for control. The CCEs which make up a PDCCH, will be spread in time and frequency in a pseudo random manner within the control region.

The CRS are used by the UE 120 for downlink channel estimation. Channel estimation is used for determining the demodulation of downlink data both when the UE 120 is in RRC connected state and is receiving user data and when the UE 120 is in RRC idle state and is reading system information. Downlink CRS are inserted within the first and third last OFDM symbol of each slot with a frequency domain spacing of six sub-carriers.

The subframe also comprises data symbols used for transmitting user data between the network node 110 and the UE 120. The data symbols are situated in the region following the control region, which is also referred to as the data region.

Figure 3:
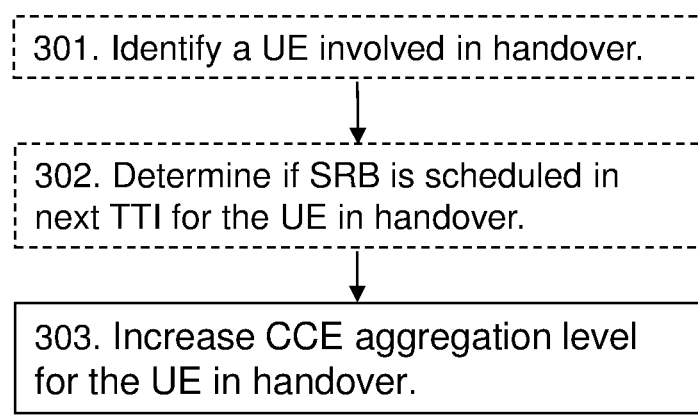
FIG. 3 is a flowchart depicting embodiments of a method in a network node.

Example of embodiments of a method performed by the network node 110 for handling handover of a UE, will now be described with reference to a flowchart depicted in FIG. 3.

The method comprises the following actions, which actions may be taken in any suitable order. Dashed lines of a box in FIG. 3 indicate that this action is not mandatory.

Action 301

In some embodiments herein, the network node 110 identifies the UE 120 involved in a handover from the first cell 130 to the second cell 131. This may be identified by the network node 110 receiving a measurement of signal strength of the first cell 130 and the second cell 131 from the UE 120. If a measurement report from the UE 120 shows that the signal strength of the second cell 131 is better than the signal strength of the first cell 130 that the UE 120 is camping on, a handover may be triggered for UE 120. This may also be referred to as the UE 120 being in handover.

Action 302

When a UE 120 involved in handover has been identified, the network node 110 may further determine if a Signaling Radio Bearer (SRB) is to be scheduled in the next Transmission Time Interval (TTI) for the UE 120 involved in handover. The SRB carries Downlink Control Channel (DCCH) signaling data and is used during connection establishment to send signaling to the UE 120 to start the desired connection, i.e. the SRB may serve as a trigger for performing handover.

In a further embodiment herein, Deep Packet Inspection (DPI) may be used to determine if an SRB is actually sent in a following TTI.

Action 303

When an SRB is determined to be scheduled for the UE 120 in the handover from the first cell 130 to a second cell 131, the network node 110 increases the Control Channel Element (CCE) aggregation level in an OFDM-subframe to be sent to the UE 120 in a TTI related to the handover. The CCE aggregation level is increased by increasing the number of CCEs assigned to the PDCCH of a specific UE 120 in the OFDM-subframe. The TTI related to the handover may be one or more TTI directly before, during or directly after the TTI were the handover related signaling is expected to be sent. In a preferred embodiment however, the CCE aggregation level of the OFDM-subframe is only increased in TTIs where handover related signaling is expected to be sent. In a further advantageous embodiment herein, the CCE aggregation level of the OFDM-subframe is only increased in TTIs where handover related signaling is actually known to be sent.

To improve data transfer it is beneficial to only include as few OFDM-symbols as possible in the control region of the OFDM-subframe. This ensures a maximum number of OFDM-symbols available for data transfer, thereby allowing a high data throughput and peak rate. This is especially important for voice services over LTE. However, using only one OFDM-symbol for the control region of the subframe has the disadvantage that CRS and PDCCH have to share the limited number of available REs in the first OFDM-symbol of the control region. When using shifted CRS in neighboring cells, the frequency shifted CRS of the neighboring cells may interfere with the PDCCH of the current cell. It has been shown that unsuccessful handovers is one of the main reasons for lost calls when voice services are provided over LTE. Although an increased CCE aggregation level reduces the available REs for data transfer, applying an increased CCE aggregation level during handover drastically increases the quality of the connection.

To increase the robustness of the PDCCH towards interference from shifted CRS in neighboring cells according to embodiments herein, the network node 110 may increase the CCE aggregation level of the OFDM-subframe to 2, 4 or 8. By increasing the CCE aggregation level during a handover procedure, the effective coding rate of the PDCCH is increased. Higher aggregation levels provide a more robust coding and reliability for the UEs under poor Radio Frequency (RF) conditions, since PDCCH is spread in time into symbols not polluted by CRS symbols from neighboring cells. However, resources are saved if the CCE aggregation level is kept low for UEs in good RF conditions. Hence, the number of unsuccessful handovers and lost service can effectively be reduced, whilst at the same time retaining the overall system capacity.

Usually the maximum aggregation level is limited to 8, hence the method of increasing the aggregation level is only performed for subframes where the CCE aggregation level is 1, 2 or 4. In a preferred embodiment herein the aggregation level is increased in steps of one level, i.e. from aggregation level 1 to 2, from aggregation level 2 to 4 etc. This ensures a high data throughput, since the resources are handled in an efficient way. In order to maximize the coding rate, it may however also be possible to increase the aggregation level in more than one step, e.g. from aggregation level 1 to 4. The CCE aggregation level is increased dynamically, i.e. the aggregation level is increased only during handover. If there is no UE 120 in handover or if there is no SRB scheduled for the UE 120 in handover, the network node 110 reduces the aggregation level to a minimum.

In further embodiments herein the network node 110 may increase the number of OFDM-symbols included in the control region of the OFDM-subframe to fit the increased CCE aggregation level. Since an increased CCE aggregation level requires a higher amount of available REs in the control region, there might be situations where the current size of the control region does not allow an increased CCE aggregation level. In these cases, the network node may increase the number of OFDM-symbols included in the control region, thereby increasing the number of available REs.

In some embodiments herein, the network node 110 serves multiple cells which may apply shifted CRS. In an advantageous embodiment herein, the method described above is performed in the cells 130 where shifted CRS is applied.

The method actions described above may be performed for each cell and TTI of the network node.

Figure 4:
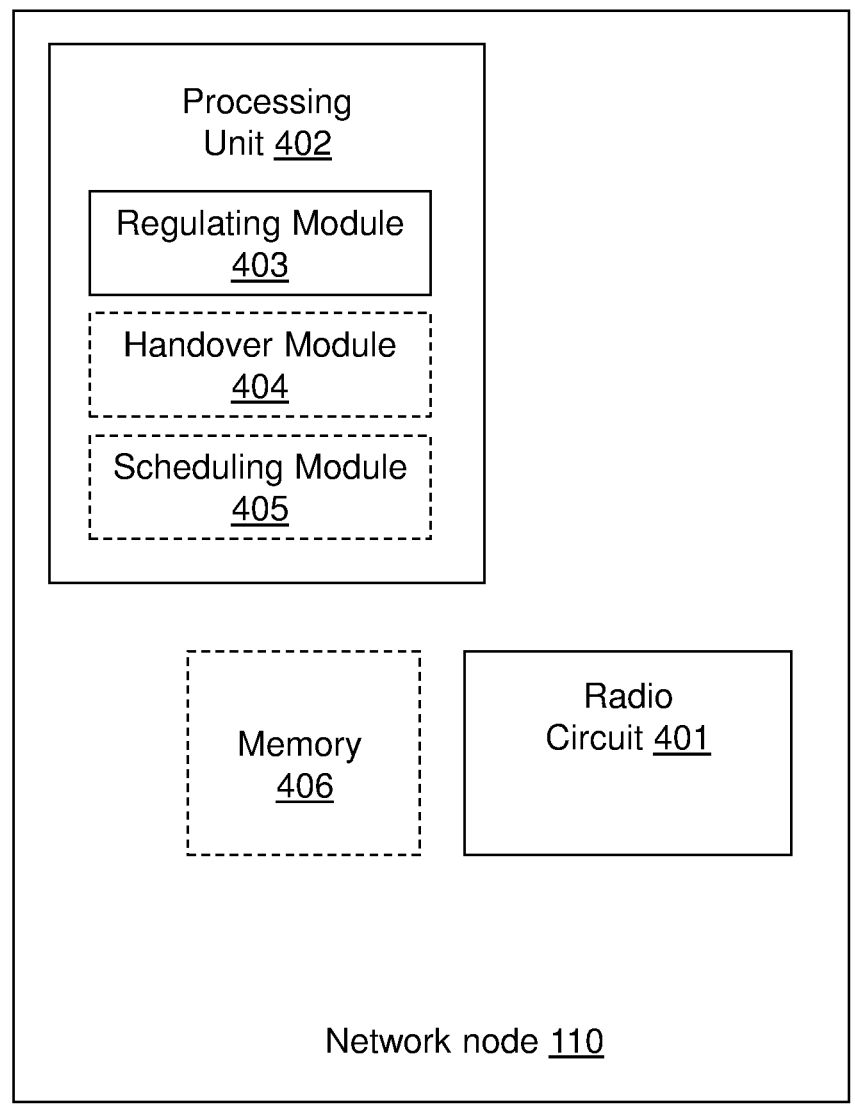
FIG. 4 is a schematic block diagram illustrating embodiments of a network node.

To perform the method actions for improving handover described above in relation to FIG. 3, the network node 110 comprises the following arrangement depicted in FIG. 4. As mentioned above the network node 110 is configured to serve at least a first cell 130 comprising one or more UEs 120.

The network node 110 comprises a radio circuitry 401 for communicating with UEs 120 and a processing unit 402.

The network node 110 is configured to, e.g. by means of a regulating module 403 being configured to, increase a Control Channel Element, CCE, aggregation level in a subframe sent to the UE 120 in a Transmission Time Interval, TTI, related to the handover, when a Signaling Radio Bearer, SRB, is determined to be scheduled for a UE 120 in handover from the first cell 130 to a second cell 131. The CCE aggregation level may be increased by increasing the number of CCEs included in the control region of the OFDM-subframe. The required CCE aggregation level may be determined based on a needed code rate for the specific UE. The regulating module 403 may be comprised in the processing unit 402.

In a further embodiment the network node may be configured to, e.g. by means of the regulating module 403 being configured to, increase the CCE aggregation level to 2, 4 or 8. The aggregation level is chosen based on the current aggregation level and the desired coding rate.

In further embodiments herein the network node may be configured to, e.g. by means of the regulating module 403 being configured to, perform the method of increasing the CCE aggregation level for subframes where the CCE aggregation level currently is 1, 2 or 4.

The network node 110 may also be configured to, e.g. by means of the regulating module 403 being configured to, increase the number of OFDM-symbols included in the control region of the OFDM-subframe to fit the increased CCE aggregation level.

In some embodiments herein, the network node 110 may be configured to, e.g. by means of a handover module 404 being configured to, identify a first UE 120 that is involved in a handover from a first cell 130 to a second cell 131. The handover module 404 may be comprised in the processing unit 402.

The network node 110 may further be configured to, or comprises a scheduling module 405 being configured to, determine if a SRB is to be scheduled for the UE 120, when the UE 120 has been identified to be involved in a handover from a first cell 130 to a second cell 131. The scheduling module 405 may be comprised in the processing unit 402.

The embodiments herein for handling a handover of a UE 120 from a first cell 130 to a second cell 131 may be implemented through one or more processors, such as the processing unit 402 in the network node 110 depicted in FIG. 4, together with computer program code for performing the functions and actions of the embodiments herein. The program code mentioned above may also be provided as a computer program product, for instance in the form of a data carrier carrying computer program code for performing the embodiments herein when being loaded into the in the network node 110. One such carrier may be in the form of a CD ROM disc. It is however feasible with other data carriers such as a memory stick. The computer program code may furthermore be provided as pure program code on a server and downloaded to the network node 110.

The network node 110 may further comprise a memory 406 comprising one or more memory units. The memory 406 is arranged to be used to store obtained information, measurements, data, configurations, schedulings, and applications to perform the methods herein when being executed in the network node 110.

Those skilled in the art will also appreciate that the regulating module 403, the handover module 404 and the scheduling module 405 described above may refer to a combination of analog and digital circuits, and/or one or more processors configured with software and/or firmware, e.g. stored in the memory 406, that when executed by the one or more processors such as the processing unit 402 as described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method, performed by a first network node, for improving performance of a handover of a user equipment (UE), wherein the network node serves at least a first cell comprising one or more UEs, the method comprising:
   determining whether a Signaling Radio Bearer (SRB) is to be scheduled in next Transmission Time Interval (TTI) for the UE involved in the handover; and
   increasing, when the SRB is to be scheduled for the UE in handover from the first cell to a second cell, a Control Channel Element (CCE) aggregation level in an Orthogonal Frequency Division Multiplexing (OFDM) subframe to be sent to the UE, which subframe is sent in the TTI related to the handover, wherein the increasing the control channel element aggregation level comprises increasing the number of CCEs assigned to a Physical Downlink Control Channel (PDCCH) of the UE in the OFDM-subframe.

2. The method of claim 1, further comprising increasing the number of OFDM-symbols included in a control region of the OFDM-subframe to fit the increased CCE aggregation level.

3. The method of claim 1, wherein the method is performed for every TTI.

4. The method of claim 1, wherein the increased CCE aggregation level of the OFDM-subframe is 2, 4, or 8.

5. The method of claim 1, wherein the method is performed for subframes where the CCE aggregation level is 1, 2, or 4.

6. The method of claim 1, further comprising increasing a number of OFDM-symbols included in a control region of the OFDM-subframe to fit the increased CCE aggregation level.

7. A network node for handling handover of a UE, wherein the network node is configured to serve at least a first cell comprising a UE, the network node comprising:
    processing circuitry;
    memory containing instructions executable by the processing circuitry whereby the network is operative to:
        determine whether a Signaling Radio Bearer (SRB) is to be scheduled in next Transmission Time Interval (TTI) for the UE involved in the handover; and
        increase, when the SRB is to be scheduled for the UE in handover from the first cell to a second cell, a Control Channel Element (CCE) aggregation level in an Orthogonal Frequency Division Multiplexing (OFDM) subframe sent to the UE in the TTI related to the handover, wherein the instructions are such that the network node is operative to increase the CCE aggregation level by increasing the number of CCEs assigned to a Physical Downlink Control Channel (PDCCH) of the UE in the OFDM-subframe.

8. The method of claim 7, wherein the instructions are such that the network node is operative to increase a number of OFDM-symbols included in a control region of the OFDM-subframe to fit the increased CCE aggregation level.

9. The method of claim 7, wherein the instructions are such that the network node is operative to perform the method for every TTI.

10. The method of claim 7, wherein the increased CCE aggregation level is 2, 4, or 8.

11. The method of claim 7, wherein the instructions are such that the network node is operative to perform the method for subframes where the CCE aggregation level is 1, 2, or 4.

12. The method of claim 7, wherein the instructions are such that the network node is operative to increase a number of OFDM-symbols included in a control region of the OFDM-subframe to fit the increased CCE aggregation level.

* * * * *